US010318020B2

(12) United States Patent
Su

(10) Patent No.: US 10,318,020 B2
(45) Date of Patent: Jun. 11, 2019

(54) REMOTE CONTROL DEVICE AND CONTROL METHOD

(71) Applicant: HON HAI PRECISION INDUSTRY CO., LTD., New Taipei (TW)

(72) Inventor: Suo-Bing Su, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/706,771

(22) Filed: Sep. 18, 2017

(65) Prior Publication Data

US 2019/0050070 A1 Feb. 14, 2019

(30) Foreign Application Priority Data

Aug. 11, 2017 (CN) .......................... 2017 1 0683642

(51) Int. Cl.
*G06F 3/0346* (2013.01)
*G08C 17/02* (2006.01)

(52) U.S. Cl.
CPC ........... *G06F 3/0346* (2013.01); *G08C 17/02* (2013.01); *G06F 2203/0383* (2013.01); *G08C 2201/32* (2013.01); *G08C 2201/92* (2013.01)

(58) Field of Classification Search
CPC .......... G06F 3/041–3/048; G06F 2203/04801; H04N 5/4403; H04N 2005/4435; H04N 2005/4444; H04N 21/4222
See application file for complete search history.

(56) References Cited

U.S. PATENT DOCUMENTS

| 6,597,347 B1 * | 7/2003 | Yasutake | G06F 3/0338 345/173 |
| 2005/0216867 A1 * | 9/2005 | Marvit | G06F 1/1613 715/863 |
| 2013/0154811 A1 * | 6/2013 | Ferren | G06K 9/3266 340/12.5 |

\* cited by examiner

*Primary Examiner* — Sanjiv D. Patel
(74) *Attorney, Agent, or Firm* — ScienBiziP, P.C.

(57) ABSTRACT

A controlling method using a remote control having a plurality of faces includes gathering signals detected by a plurality of sensors of the remote control. The remote control is determined to transmit a control signal by searching a preset table according to the gathered signals. The determined control signal is transmitted to control an electronic device to execute a control function corresponding to the control signal.

18 Claims, 4 Drawing Sheets

REMOTE CONTROL DEVICE AND CONTROL METHOD

CROSS-REFERENCE TO RELATED APPLICATIONS

This application claims priority to Chinese Patent Application No. 201710683642.X filed on Aug. 11, 2017, the contents of which are incorporated by reference herein.

FIELD

The subject matter herein generally relates to control technology, and particularly to a remote control device having a polyhedral shape and a control method using the remote control.

BACKGROUND

Generally, when a user uses a remote control to control an electric appliance such as an air conditioner, the user needs to press a predetermined key of a remote control device. There is a room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
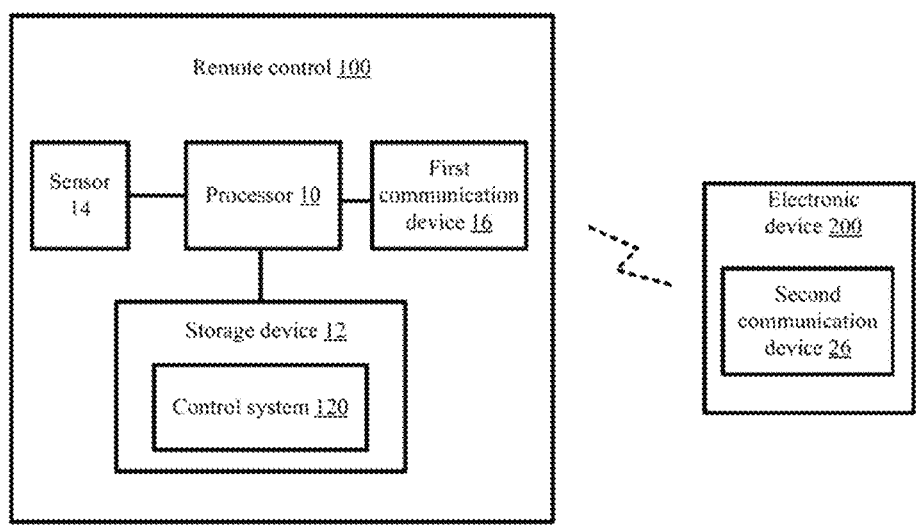
FIG. 1 is a block diagram of one exemplary embodiment of a remote control device used for controlling an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one exemplary embodiment of a remote control device 100 (hereinafter "remote control 100"). Depending on the exemplary embodiment, the remote control 100 has a polyhedral shape, i.e., the remote control 100 can be a polyhedron having a plurality of faces. In at least one exemplary embodiment, the remote control 100 can be a tetrahedron, a pentahedron, a hexahedron, an octahedron, a dodecahedron, or other kinds of polyhedron. In at least one exemplary embodiment, the remote control 100 can be a regular polyhedron, such as a regular tetrahedron, or a regular hexahedron.

The remote control 100 can include, but is not limited to, at least one processor 10, a storage device 12, a plurality of sensors 14, and a first communication device 16. In at least one exemplary embodiment, a number of the sensors 14 can be determined according to a number of faces of the remote control 100 and categories of the sensors 14.

A control system 120 can be installed in the remote control 100. The control system 120 can control one or more electronic devices 200 according to signals detected by the plurality of sensors 14. The electronic device 200 can be an air conditioner, a refrigerator, a television or other kinds of electronic device.

The electronic device 200 includes a second communication device 26. The remote control 100 and the electronic device 200 can communicate with each other through the first communication device 16 and the second communication device 26. The first communication device 16 and the second communication device 26 can be wireless communication devices such as WI-FI devices, infrared devices, or other kinds of communication devices.

In a first exemplary embodiment, the plurality of sensors 14 can be pressure sensors.

In at least one exemplary embodiment, when the sensor 14 is the pressure sensor, each face of the remote control 100 can be configured with the pressure sensor, i.e., the number of the sensors 14 equals the number of the faces of the remote control 100, such that when a certain face of the remote control 100 faces downwards, pressure signals can be detected by the pressure sensor corresponding to the certain face.

Figure 2:
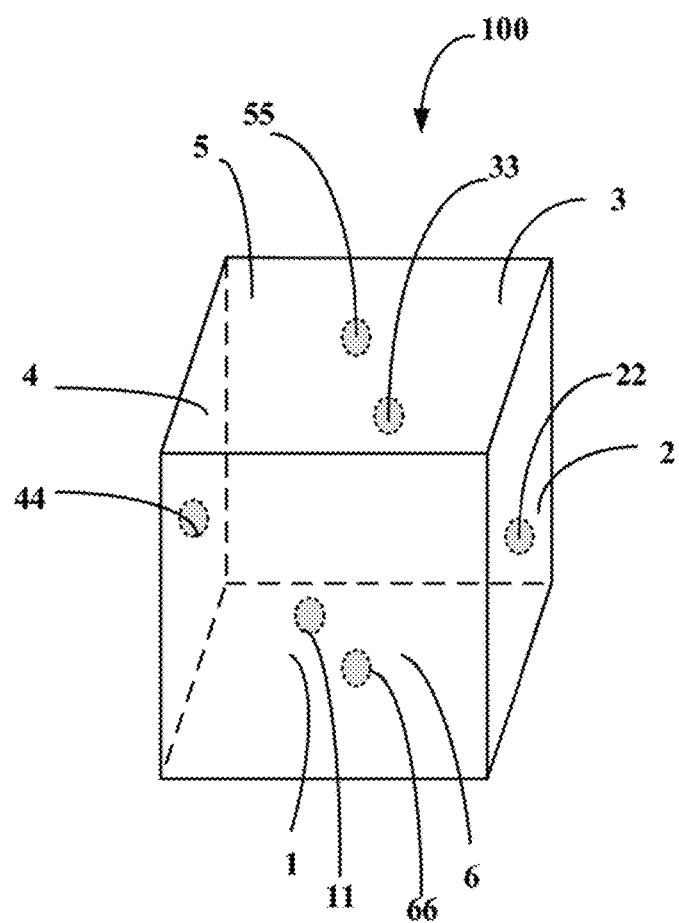
FIG. 2 illustrates an exemplary embodiment of the remote control device having a hexahedral shape.

For example, as shown in FIG. 2, when the remote control 100 is the regular hexahedron, each face of the remote control 100 is configured with the pressure sensor. It is assumed that sensors 11, 22, 33, 44, 55, and 66 are pressure sensors. For example, a face 1 of the remote control 100 is configured with a pressure sensor 11, a face 2 of the remote control 100 is configured with a pressure sensor 22, a face 3 of the remote control 100 is configured with a pressure sensor 33, a face 4 of the remote control 100 is configured with a pressure sensor 44, a face 5 of the remote control 100 is configured with a pressure sensor 55, and a face 6 of the remote control 100 is configured with a pressure sensor 66. As shown in FIG. 2, when the face 6 faces downwards, pressure signals can be detected by the pressure sensor 66 corresponding to the face 6.

In at least one exemplary embodiment, the control system 120 pre-stores a table in the storage device 12. The control system 120 lists in the table the pressure sensor corresponding to each face of the remote control 100. The control system 120 further lists a control signal corresponding to each face and a control function corresponding to the control signal in the table. When the pressure sensor corresponding to a certain face of the remote control 100 detects a pressure value that is greater than a preset pressure value, the control system 120 can transmit a control signal corresponding to the certain face, such that the control function corresponding to the control signal can be realized. In at least one exemplary embodiment, the preset pressure value can be an empirical value. For example, when the remote control 100 is put on a desk, the pressure sensor corresponding to the face of the remote control 100 that faces downwards (i.e., facing the desk) detects a pressure value, the pressure value can be used as a reference value, the preset pressure value can be less than or equal to the reference value.

In at least one exemplary embodiment, as shown in FIG. 2, the control system 120 can preset the face 1 to correspond to a first control signal, the face 2 to correspond to a second control signal, the face 3 to correspond to a third control signal, the face 4 to correspond to a fourth control signal, the face 5 to correspond to a fifth control signal, and the face 6 to correspond to a sixth control signal. When the face 6 faces downwards, and the pressure value detected by the pressure sensor 66 corresponding to the face 6 is greater than the preset pressure value, the control system 120 can transmit the sixth control signal, such that the control function corresponding to the sixth control signal can be realized.

In at least one exemplary embodiment, control functions corresponding to the first to sixth control signals can be functions to control one electronic device 200. For example, a first control function corresponding to the first control signal can be a function of turning on the air conditioner, a second control function corresponding to the second control signal can be a function of turning off the air conditioner, a third control function corresponding to the third control signal can be a function of starting cooling function of the air conditioner, a fourth control function corresponding to the fourth control signal can be a function of starting heating function of the air conditioner, a fifth control function corresponding to the fifth control signal can be a function of turning up a temperature of the air conditioner, and a sixth control function corresponding to the sixth control signal can be function of turning down the temperature of the air conditioner.

In other exemplary embodiments, control functions corresponding to the first to sixth control signals can be functions to control different electronic devices 200. For example, the first control function can be the function of turning on the air conditioner, the second control function can be a function of turning on a television, the third control function can be a function of turning on a smart light, the fourth function can be a function of turning on a computer, the fifth function can be a function of turning on a refrigerator, and the sixth control function can be a function of turning on a sweeping robot.

In at least one exemplary embodiment, the table further lists an opposite face corresponding to each face of the remote control 100. When the pressure sensor corresponding to a certain face of the remote control 100 detects the pressure value that is greater than the preset pressure value, the control system 120 can transmit the control signal that is corresponding to the face which is opposite to the certain face.

For example, as shown in FIG. 2, the control system 120 can record the face 1 and the face 3 are opposite to each other, the face 2 and the face 4 are opposite to each other, and the face 5 and the face 6 are opposite to each other in the table. When the pressure sensor 66 corresponding to the face 6 of the remote control 100 detects the pressure value that is greater than the preset pressure value, the control system 120 can transmit the fifth control signal that is corresponding to the face 5, i.e., the opposite face of the face 6, such that a function corresponding to one face of the remote control 100 that faces upwards can be realized.

In a second exemplary embodiment, the plurality of sensors 14 can be gravity sensors (g-sensors).

In at least one exemplary embodiment, when the sensor 14 is the gravity sensor, each face of the remote control 100 can be configured with the gravity sensor, i.e., the number of the sensors 14 equals the number of the faces of the remote control 100. Thereby, when a certain face of the remote control 100 faces upwards, a gravity acceleration detected by the gravity sensor corresponding to the certain face equals "g". When the certain face of the remote control 100 faces downwards, the gravity acceleration detected by the gravity sensor corresponding to the certain face equals "−g".

Similarly, when the sensor 14 is the gravity sensor, the control system 120 can list the gravity sensor corresponding to each face of the remote control 100 in the table. The control system 120 can further list a control signal corresponding to each face and a control function corresponding to the control signal in the table. When the gravity sensor corresponding to a certain face of the remote control 100 detects that the gravity acceleration is "−g", the control system 120 can transmit a control signal corresponding to the certain face, such that the control function corresponding to the control signal can be realized.

As shown in FIG. 2, when the remote control 100 is the regular hexahedron, each face of the remote control 100 is configured with the gravity sensor. It is assumed that sensors 11, 22, 33, 44, 55, and 66 are gravity sensors. When the face 5 faces upwards, and the face 6 faces downwards, the gravity acceleration detected by the gravity sensor 55 corresponding to the face 5 equals "g", and the gravity acceleration detected by the gravity sensor 66 corresponding to the face 6 equals "−g". The control system 120 can transmit the sixth control signal corresponding to the face 6.

In other exemplary embodiments, when the gravity acceleration corresponding to a certain face of the remote control 100 equals "−g", the control system 120 can transmit the control signal corresponding to an opposite face of the certain face. It should be noted that the control system 120 can also transmit the control signal based on the gravity acceleration being "g", i.e., when the gravity sensor corresponding to a certain face of the remote control 100 detects that the gravity acceleration is "g", the control system 120 can transmit the control signal corresponding the certain face.

As shown in FIG. 2, the gravity acceleration detected by the gravity sensor 55 corresponding to the face 5 equals "g", the control system 120 can transmit the fifth control signal corresponding to the face 5.

When the sensor 14 is the gravity sensor, two faces that are opposite to each other can be configured with a same gravity sensor, i.e., one gravity sensor can be utilized for two opposing faces. That is, when a first face of the two faces faces upwards, and a second face of the two faces faces downwards, the same gravity sensor corresponding to the first face detects the gravity acceleration as "g", and the same gravity sensor corresponding to the second face detects the gravity acceleration as "−g". For example, when the remote control 100 is the regular hexahedron, the face 1 and face 3 are configured with a first gravity sensor, the face 2 and face 4 are configured with a second gravity sensor, and the face 5 and face 6 are configured with a third gravity sensor. That is, only three gravity sensors are needed for the regular hexahedron.

In a third exemplary embodiment, the plurality of sensors 14 can be light sensors.

In at least one exemplary embodiment, when the sensor 14 is the light sensor, each face of the remote control 100 can be configured with the light sensor, i.e., the number of sensors 14 equals the number of the faces of the remote control 100, such that when a certain face of the remote control 100 faces downwards, a light value detected by the light sensor corresponding to the certain face is decreased.

In at least one exemplary embodiment, when the sensor 14 is the light sensor, the control system 120 can list the light sensors corresponding to each face of the remote control 100 in the table. The control system 120 can further list a control signal corresponding to each face and a control function corresponding to the control signal in the table. When the light sensor corresponding to a certain face of the remote control 100 detects a light value that is less than a preset light value, the control system 120 can transmit a control signal corresponding to the certain face, such that the control function corresponding to the control signal can be realized. In at least one exemplary embodiment, the preset light value can be an empirical value. For example, when the remote control 100 is put on a desk, the light sensor corresponding to the face of the remote control 100 that faces downwards detects a light value, the light value can be used as a reference value, and the preset light value can be less than or equal to the light value.

As shown in FIG. 2, when the remote control 100 is the regular hexahedron, each face of the remote control 100 is configured with the light sensor. It is assumed that sensors 11, 22, 33, 44, 55, and 66 are light sensors. When the face 5 faces upwards and the face 6 faces downwards, the light value detected by the light sensor 66 corresponding to the face 6 is decreased and is less than the preset light value, the control system 120 can transmit the sixth control signal corresponding to the face 6 because the light sensor 66 corresponding to the face 6 detects the light value that is less than the preset light value.

In other exemplary embodiments, when the light value detected by the light sensor corresponding to a certain face of the remote control 100 that is less than the preset light value, the control system 120 can transmit the control signal corresponding to an opposite face of the certain face.

In actual use, each face of the remote control 100 can be colored with different colors, such that a user can easily distinguish the control function corresponding to each face.

Figure 3:
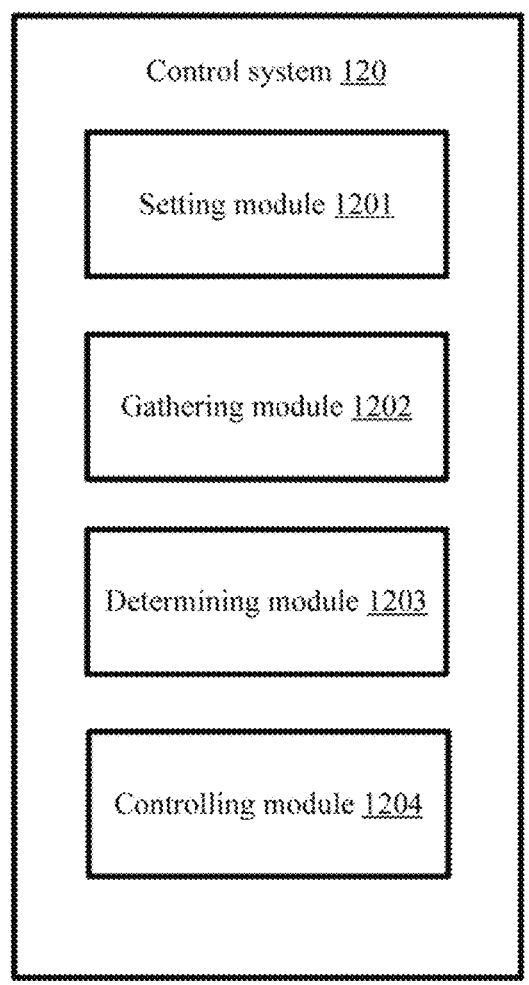
FIG. 3 is a block diagram of one exemplary embodiment of a control system included in the remote control device of FIG. 1.

In at least one exemplary embodiment, as shown in FIG. 3, the control system 120 can include, but is not limited to, a setting module 1201, an obtaining module 1202, a determining module 1203, and a controlling module 1204. In at least one exemplary embodiment, the modules 1201-1204 include computerized codes in the form of one or more programs that may be stored in the storage device 12. The computerized codes include instructions that can be executed by the processor 10.

Figure 4:
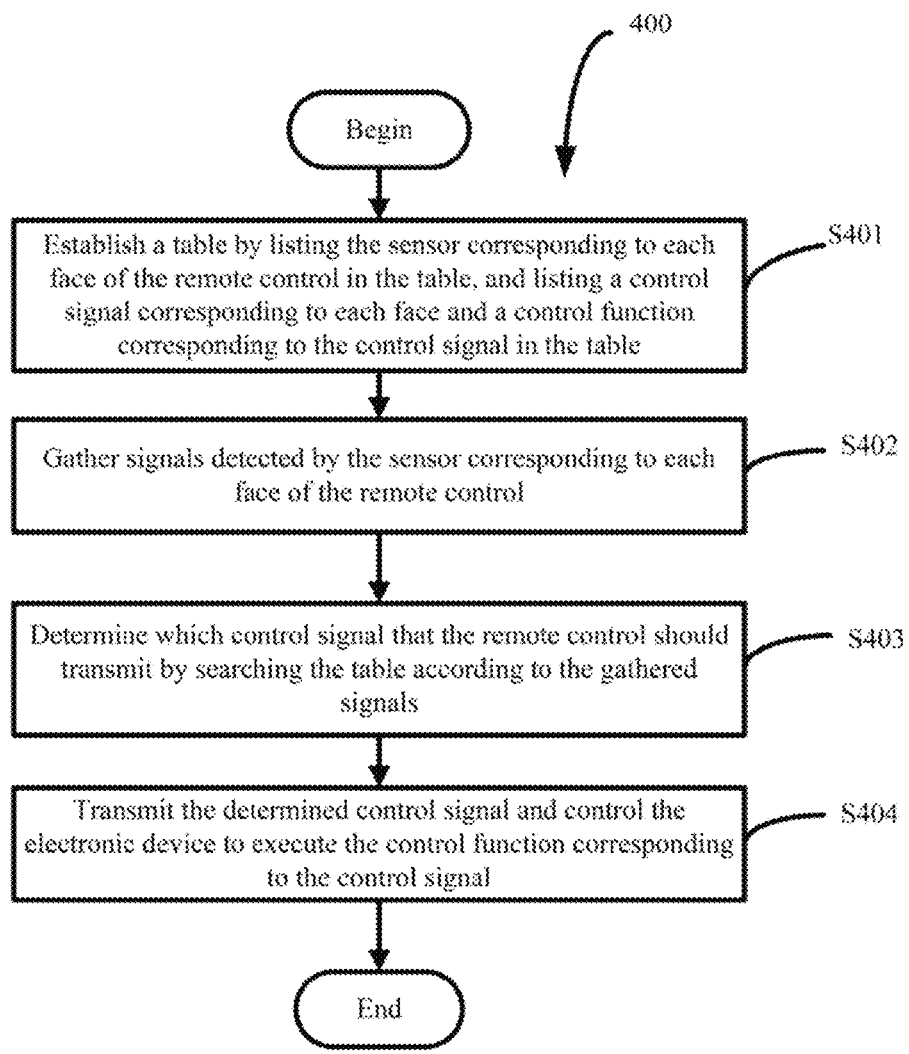
FIG. 4 illustrates a flow chart of one exemplary embodiment of a control method applied to the remote control device of FIG. 1.

FIG. 4 illustrates a flowchart which is presented in accordance with an example embodiment. The exemplary method 400 is provided by way of example, as there are a variety of ways to carry out the method. The method 400 described below can be carried out using the configurations illustrated in FIG. 1, for example, and various elements of these figures are referenced in explaining exemplary method 400. Each block shown in FIG. 4 represents one or more processes, methods, or subroutines, carried out in the exemplary method 400. Additionally, the illustrated order of blocks is by example only and the order of the blocks can be changed. The exemplary method 400 can begin at block S401. Depending on the embodiment, additional steps can be added, others removed, and the ordering of the steps can be changed.

At block S401, the setting module 1201 can establish a table. The setting module 1201 can list the sensor 14 corresponding to each face of the remote control 100 in the table. The setting module 1201 can further list a control signal corresponding to each face and a control function corresponding to the control signal in the table.

In at least one exemplary embodiment, the setting module 1201 can store the table in the storage device 12.

In a first exemplary embodiment, when the sensor 14 is the pressure sensor, and each face of the remote control 100 is configured with the pressure sensor, the setting module 1201 can list the pressure sensor corresponding to each face of remote control 100 in the table. The setting module 1201 can further list the control signal corresponding to each face and the control function corresponding to the control signal in the table.

In a second exemplary embodiment, when the sensor 14 is the gravity sensor, and each face of the remote control 100 is configured with the gravity sensor, the setting module 1201 can list the gravity sensor corresponding to each face of remote control 100 in the table. The setting module 1201 can further list the control signal corresponding to each face and the control function corresponding to the control signal in the table.

In a third exemplary embodiment, when the sensor 14 is the light sensor, and each face of the remote control 100 is configured with the light sensor, the setting module 1201 can list the light sensor corresponding to each face of remote control 100 in the table. The setting module 1201 can further list the control signal corresponding to each face and the control function corresponding to the control signal in the table.

For example, as shown in FIG. 2, when the remote control 100 is the regular hexahedron, and each face of the remote control 100 is configured with the pressure sensor, the setting module 1201 can list in the table that a face 1 of the remote control 100 corresponds to a pressure sensor 11, a face 2 of the remote control 100 corresponds to a pressure sensor 22, a face 3 of the remote control 100 corresponds to a pressure sensor 33, a face 4 of the remote control 100 corresponds to a pressure sensor 44, a face 5 of the remote control 100 corresponds to a pressure sensor 55, and a face 6 of the remote control 100 corresponds to a pressure sensor 66. The setting module 1201 can further list in the table that the face 1 corresponds to a first control signal, the face 2 corresponds to a second control signal, the face 3 corresponds to a third control signal, the face 4 corresponds to a fourth control signal, the face 5 corresponds to a fifth control signal, the face 6 corresponds to a sixth control signal.

In at least one exemplary embodiment, the control signals corresponding to different faces of the remote control 100 are used to control a same electronic device 200.

For example, the first control signal can be used to turn on the air conditioner, the second control signal can be used to turn off the air conditioner, the third control signal can be used to start cooling function of the air conditioner, the fourth control signal can be used to start heating function of the air conditioner, the fifth control signal can be used to turn up a temperature of the air conditioner, and the sixth control signal can be used to turn down the temperature of the air conditioner.

In other exemplary embodiments, the control signals corresponding to different faces of the remote control 100 are used to control different kinds of electronic devices 200.

For example, the first control signal can be used to turn on the air conditioner, the second control signal can be used to turn on a television, the third control signal can be used to turn on a smart light, the fourth control signal can be used to turn on a computer, the fifth control signal can be used to turn on a refrigerator, and the sixth control signal can be used to turn on a sweeping robot.

In at least one exemplary embodiments, the setting module 1201 can further lists an opposite face corresponding to each face of the remote control 100 in the table.

For example, the setting module 1201 can record in the table that the face 1 and the face 3 are opposite to each other, the face 2 and the face 4 are opposite to each other, the face 5 and the face 6 are opposite to each other.

At block S402, the obtaining module 1202 can gather signals detected by the sensor 14 corresponding to each face of the remote control 100.

At block S403, the determining module 1203 can determine which control signal that the remote control 100 should transmit by searching the table according to the gathered signals.

In a first exemplary embodiment, when the sensor 14 is the pressure sensor, and the pressure sensor corresponding to a certain face of the remote control 100 detects a pressure value that is greater than a preset pressure value, the determining module 1203 determines that the remote control 100 should transmit the control signal corresponding to the certain face listed in the table. In other exemplary embodiments, the determining module 1203 determines that the remote control 100 should transmit the control signal corresponding to the opposite face of the certain face listed in the table.

In a second exemplary embodiment, when the sensor 14 is the gravity sensor, and the gravity acceleration detected by the gravity sensor corresponding to a certain face of the remote control 100 equals "−g", the determining module 1203 determines that the remote control 100 should transmit the control signal corresponding to the certain face listed in the table. In other exemplary embodiments, the determining module 1203 determines that the remote control 100 should transmit the control signal corresponding to the opposite face of the certain face listed in the table. In other exemplary embodiments, when the gravity acceleration detected by the gravity sensor corresponding to a certain face of the remote control 100 equals "g", the determining module 1203 determines that the remote control 100 should transmit the control signal corresponding to the certain face listed in the table.

In a third exemplary embodiment, when the sensor 14 is the light sensor, and the light sensor corresponding to a certain face of the remote control 100 detects a light value that is less than a preset light value, the determining module 1203 determines that the remote control 100 should transmit the control signal corresponding to the certain face listed in the table. In other exemplary embodiments, the determining module 1203 determines that the remote control 100 should transmit the control signal corresponding to the opposite face of the certain face listed in the table.

At block S404, the controlling module 1204 can transmit the determined control signal and control the electronic device 200 to execute the control function corresponding to the control signal.

The controlling module 1204 can transmit the determined control signal using the first communication module 16.

For example, it is assumed that the determining module 1203 determines that the remote control 100 should transmit the control signal of activating the smart light at block S403, then the controlling module 1204 can transmit the control signal of activating the smart light through the first communication module 16, such that the smart light can be activated.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A remote control having a plurality of faces comprising:
a plurality of light sensors, wherein each face of the remote control is set with one of the plurality of light sensors;
at least one processor;
a storage device storing a table that lists each of the light sensors corresponding to each of the faces of the remote control, a control signal corresponding to each of the faces and a control function corresponding to the control signal;
the storage device further storing computerized instructions, which when executed by the at least one processor, cause the at least one processor to:
obtain a light value detected by each of the light sensors;
determine which of the control signal that the remote control to transmit, according to one of the faces of the remote control listed in the table that is determined according to the light value detected by each of the light sensors; and
transmit the determined control signal and control an electronic device to execute the control function corresponding to the control signal.

2. The remote control according to claim 1, wherein a total number of the plurality of light sensors equals a total number of the faces of the remote control.

3. The remote control according to claim 1,
wherein the light sensor corresponding to the face of the remote control detects a light value less than a preset light value, the remote control is determined to transmit the control signal corresponding to the face of the remote control.

4. The remote control according to claim 1, wherein the table further lists an opposite face corresponding to each face;
wherein the light sensor corresponding to the one face of the remote control detects a light value that is less than a preset light value, and the at least one processor determines that the remote control should transmit the control signal corresponding to the opposite face of the one face of the remote control.

5. The remote control according to claim 1, wherein control signals corresponding to different faces of the remote control listed in the table are used to control different kinds of electronic devices.

6. The remote control according to claim 1, wherein control signals corresponding to different faces of the remote control listed in the table are used to control a same electronic device.

7. A controlling method applied to a remote control having a plurality of faces and a plurality of light sensors, each face of the remote control being set with one of the plurality of light sensors, the method comprising:
   establishing a table that lists each light sensor of the plurality of light sensors corresponding to each of the faces of the remote control, a control signal corresponding to each of the faces and a control function corresponding to the control signal;
   obtaining a light value detected by each of the light sensors;
   determining which of the control signal that the remote control to transmit, according to one of the faces of the remote control listed in the table that is determined according to the light value detected by each of the light sensors; and
   transmitting the determined control signal and control an electronic device to execute the control function corresponding to the control signal.

8. The controlling method according to claim 7,
wherein a total number of the plurality of light sensors equals a total number of the faces of the remote control.

9. The controlling method according to claim 7,
wherein the light sensor corresponding to the face of the remote control detects a light value less than a preset light value, the remote control is determined to transmit the control signal corresponding to the face of the remote control.

10. The controlling method according to claim 7, wherein the table further lists an opposite face corresponding to each face;
   wherein the light sensor corresponding to the one face of the remote control detects a light value that is less than a preset light value,
   and the remote control is determined to transmit the control signal corresponding to the opposite face of the one face of the remote control.

11. The controlling method according to claim 7, wherein control signals corresponding to different faces of the remote control listed in the table are used to control different kinds of electronic devices.

12. The controlling method according to claim 7, wherein control signals corresponding to different faces of the remote control listed in the table are used to control a same electronic device.

13. A non-transitory storage medium having stored thereon instructions that, when executed by a processor of a remote control having a plurality of faces, causes the processor to perform a controlling method, the remote control comprising a plurality of light sensors, each face of the remote control being set with one of the plurality of light sensors, wherein the method comprises:
   establishing a table that lists each light sensor of the plurality of light sensors corresponding to each of the faces of the remote control, a control signal corresponding to each of the faces and a control function corresponding to the control signal;
   obtaining a light value detected by each of the light sensors;
   determining which of the control signal that the remote control to transmit, according to one of the faces of the remote control listed in the table that is determined according to the light value detected by each of the light sensors; and
   transmitting the determined control signal and control an electronic device to execute the control function corresponding to the control signal.

14. The non-transitory storage medium according to claim 13,
wherein a total number of the plurality of light sensors equals a total number of the faces of the remote control.

15. The non-transitory storage medium according to claim 13,
wherein the light sensor corresponding to the face of the remote control detects a light value less than a preset light value, the remote control is determined to transmit the control signal corresponding to the face of the remote control.

16. The non-transitory storage medium according to claim 13, wherein the table further lists an opposite face corresponding to each face;
   wherein the light sensor corresponding to the one face of the remote control detects a light value that is less than a preset light value,
   and the remote control is determined to transmit the control signal corresponding to the opposite face of the one face of the remote control.

17. The non-transitory storage medium according to claim 13, wherein control signals corresponding to different faces of the remote control listed in the table are used to control different kinds of electronic devices.

18. The non-transitory storage medium according to claim 13, wherein control signals corresponding to different faces of the remote control listed in the table are used to control a same electronic device.

* * * * *